United States Patent [19]
D'Ercole

[11] 3,975,547
[45] Aug. 17, 1976

[54] PROCESS OF MAKING A DRY-FREE-FLOWING BEVERAGE MIX AND PRODUCT

[75] Inventor: Augustine D. D'Ercole, White Plains, N.Y.

[73] Assignee: General Foods Corporation, White Plains, N.Y.

[22] Filed: May 15, 1974

[21] Appl. No.: 470,241

[52] U.S. Cl. .............................. 426/106; 426/415; 426/590; 127/29; 127/63
[51] Int. Cl.² ...................... A23L 2/38; C13F 5/00
[58] Field of Search ........... 426/213, 190, 365, 366, 426/380, 415, 465, 106, 590, 591, 599; 127/29, 30, 63

[56] References Cited
UNITED STATES PATENTS

| 285,654 | 9/1883 | Norton | 127/30 |
|---|---|---|---|
| 2,058,852 | 10/1936 | Bruce | 426/380 X |
| 2,141,547 | 12/1938 | Newkirk | 127/30 |
| 2,147,549 | 2/1939 | Roselius | 426/213 X |
| 2,868,646 | 1/1959 | Schapiro | 426/190 X |
| 2,959,486 | 11/1960 | Strashun et al. | 426/366 X |
| 3,397,063 | 8/1968 | Carlson | 426/366 X |
| 3,436,224 | 4/1969 | Bode | 426/366 X |
| 3,615,710 | 10/1971 | Lee et al. | 426/415 X |
| 3,632,354 | 1/1972 | Swaine et al. | 426/366 |
| 3,836,396 | 9/1974 | McNamara et al. | 426/213 X |

Primary Examiner—Steven L. Weinstein
Attorney, Agent, or Firm—Bruno P. Struzzi; Thomas V. Sullivan; Michael J. Quillinan

[57] ABSTRACT

Dry beverage mixes that are stable, free flowing and economical are produced by incorporating as a minor constituent thereof up to the level of 50% of the saccharides present, a dessicated dextrose having a moisture content, as packaged, less than 1% and greater than 0.03% under controlled relative humidity packaging.

7 Claims, No Drawings

PROCESS OF MAKING A DRY-FREE-FLOWING BEVERAGE MIX AND PRODUCT

BACKGROUND OF THE INVENTION

The present invention relates to dry beverage mixes and more particularly to the preparation of an economical beverage mix wherein sucrose is replaced in part by dextrose.

Heretofore, dry beverage mixes containing flavor, food acid, color and a natural sweetener such as sucrose, have been limited in the ability to effect a partial substitution for the sucrose by dextrose. The dextrose of commerce commonly is a dextrose monohydrate having approximately 8% water of crystallization. The admixture of dextrose in this form with sucrose even under the most expensive packaging conditions, including controlled relative humidity packaging, is fraught with difficulties stemming from the hygroscopic character of the dextrose and generally its tendency to contribute towards caking and color and flavor change; a need has existed for a long time in this art to effect a practical procedure whereby the sucrose level can be partially substituted for by an economical source of sweetening agent and filler material drawn from the class of natural saccharides.

It is an object of this invention to provide a saccharide replacement for sucrose which is both economical, readily handleable, and when packaged, does not contribute a change in flavor or color of the beverage mix or occasion caking. The advantages of such a sucrose substitution should include the ability to reduce the sucrose intake and thereby provide an overall health benefit to those sensitive to high sucrose intake.

STATEMENT OF THE INVENTION

In accordance with the present invention, dextrose monohydrate is subjected to dessication whereby it is reduced to a moisture content measured by a vacuum oven to less than 1% and ideally as close to 0.03% as is practicable under commercial drying methods. This dessication is practiced using forced circulation drying procedures wherein the heating medium over prolonged period of time does not exceed 200°F. and typically may be in the order of 150°F. or that temperature whereat browning is not occasioned by elevated long term exposure to a drying medium. The dessicated dextrose is recovered in a granular free flowing form and is handled under controlled relative humidity packaging and preferably is admixed with agents such as silicagel packets and their equivalents operative to control the humidity conditions in the area immediately adjacent and in the interstices between particles of the dessicated dextrose. The dessicated dextrose in combination with the saccharides and other beverage mix ingredients in a tote or like bin will be kept at a moisture content which, in any event, will not exceed 2% and preferably be below 1% preparatory to and during dry blending, filling and packaging of the beverage-making ingredients. Packaging will be in a package having a controlled water vapor transmission rate as specified herein at less than 60% R. H. at 68°F.

DETAILED DESCRIPTION OF THE INVENTION

The dessicated dextrose is used as a minor percent, say, anywhere in the range between 15 and 30% preferably but conceivably ranging up to 50 weight percent of the beverage mix saccharides (sucrose). The mix ingredients will be packaged in specially specified packaging material having a water vapor transmission characteristic such as does not permit the passage of 0.10 gms of water per 100 sq. in. per 24 hours at 100°F. (95% Rel. Humidity).

Typically, this packaging material will be composed of a multi-coating of polyethylene on foil, the foil ranging between 0.00025 and 0.00045 inches thickness and being coated by such as low density polyethylene on its inner as well as its outer ply, a functional decorative paper coating being on the exterior ply but serving no known operative purpose in accordance with this invention.

The features of this invention that are unexpected and unobvious are not too well understood since heretofore it had been generally thought that dextrose monohydrate was non-dessicable in the sense that it was felt one could not feasibly alter the packaging characteristics of the dextrose due to the chemically bound moisture of the dextrose. It was therefore unexpected that by the foregoing practices one was able to effectively achieve the aforestated reduction in sugar content while achieving packaging stability, which findings are now to be better understood by reference to the accompanying example.

BEST MODE

Dextrose monohydrate of approximately 8.5% moisture was deposited in a Young Brothers-through-circulation dryer for dessication over a period of 3 days; during this period, heated air was caused to be continuously circulated through the dryer superjacent a ½ inch bed thereof whereby at the end of 3 days, dessicated dextrose was recovered at a moisture content of 0.3% (measured by an Ohaus Moisture Meter). During this period, the temperature of air circulating in the dryer was maintained at 150°F. During the drying operation, water was caused to be evaporated initially from the surface of the bed and progressively from the lower strata thereof. During the drying operation, the product was caused to undergo a gradual elevation in temperature first through convection and later conduction until it reached an equilibrium temperature approaching the air temperature of 150°F., which condition was maintained throughout the majority of the drying cycle.

Following dehydration, the dessicated dextrose was mixed with silicagel packets by putting the dessicated dextrose in a polyethylene bag and adding the packets, thereby controlling the moisture content in the atmosphere of the bag and in the interstices between the particles; the bag was maintained in this moisture-free state until formulation of a dry beverage mix.

The following dry beverage master mix was prepared:

| Ingredients | Parts by Weight |
|---|---|
| Sugar | 94.01 |
| Citric Acid | 1.79 |
| MCP (Mono-calcium phosphate | 1.50 |
| Vitamin C | .05 |
| Red Color | .05 |
| Flavor | .03 |
| Vitamin A | .01 |

Approximately 70 parts by weight of the foregoing master mix were added to 30 parts of the dessicated dextrose by blending in a Paterson-Kelly V-blender until a uniform admixture was achieved (approximately 5 minutes blending). This blended material was then immediately charged into packages of pouch material which had the following characteristic for the pouch barrier thereof; the packaging barrier was a poly-coated foil approximately thirty-five thousandths of an inch thickness, coated with low density polyethelene. The poly-coated foil structure was essentially a four layer foil structure comprising 25 pounds paper/22½ pounds low density polyethelene as the interior sealing barrier/0.00035 inches foil/ and 7½ pounds low density polyethelene, the weight being expressed as a weight per 3000 sq. feet of stock. The polycoated paper was converted into a butting, two sided, fin-sealed foil pouch and the beverage mix charged therein was thereafter sealed under conditions operative to provide a water vapor transmission rate of less than 0.05 gms/100 sq. in./24 hours at 100°F. (95% Relative Humidity). The blending, filling and packaging were all conducted under controlled low relative humidities, to wit, a relative humidity of less than 60% relative humidity at 68°F.

The packaged mix was subjected to accelerated storage testing, i.e., 100°F. at 88%, 70% and 85% relative humidity; the packed beverage mix was also tested under room temperature. Samples withdrawn after 16 weeks storage were essentially free flowing powders without evidences of caking, flavor change or color deterioration. What is claimed is:

1. The method of producing a dry free-flowing beverage mix containing sucrose and a significant amount up to 50% of dextrose by weight of the mix saccharides which comprises dessicating dextrose monohydrate to a moisture less than 1% and greater than 0.03%, admixing the dessicated dextrose, the sucrose and other dry beverage-making constituents including a food acid, and packaging the dry beverage mix in a packaging barrier material whose moisture transmission rate does not exceed 0.05 gms./100 sq. in./24 hours at 100°F. and 95% Relative Humidity, the mix being maintained below a moisture content of 2% preparatory to and during packaging.

2. The method of claim 1 wherein the mix is blended, filled and packaged in an atmosphere having less than those grains of moisture present in air at 60% Relative Humidity and 68°F.

3. The packaged mix of claim 1.

4. The method of claim 1 which comprises maintaining the mix below a moisture content of 1% preparatory to and during packaging.

5. The method of claim 4 wherein the dessicated dextrose is at a level of 15–30% of the beverage saccharides mix.

6. The method of claim 4 wherein the dextrose monohydrate is dessicated at a temperature less than 200°F.

7. The method of claim 5 wherein the monohydrate is dried by a forced circulation gaseous drying medium.

* * * * *